(12) United States Patent
Slayne et al.

(10) Patent No.: US 10,371,213 B2
(45) Date of Patent: Aug. 6, 2019

(54) SYSTEM, METHOD AND APPARATUS FOR TOLERANCE RING CONTROL OF SLIP INTERFACE SLIDING FORCES

(71) Applicant: Saint-Gobain Performance Plastics Rencol Limited, Coventry (GB)

(72) Inventors: Andrew R. Slayne, Bristol (GB); Parag Natu, Neuss (DE)

(73) Assignee: SAINT-GOBAIN PERFORMANCE PLASTICS RENCOL LIMITED, Coventry (GB)

(*) Notice: Subject to any disclaimer, the term of this patent is extended or adjusted under 35 U.S.C. 154(b) by 397 days.

(21) Appl. No.: 14/563,849

(22) Filed: Dec. 8, 2014

(65) Prior Publication Data

US 2015/0114549 A1 Apr. 30, 2015

Related U.S. Application Data

(63) Continuation of application No. 13/947,789, filed on Jul. 22, 2013, now abandoned, which is a
(Continued)

(51) Int. Cl.
*F16C 27/00* (2006.01)
*F16D 1/08* (2006.01)
(Continued)

(52) U.S. Cl.
CPC ............ *F16D 1/0835* (2013.01); *F16C 27/02* (2013.01); *F16D 3/06* (2013.01); *F16D 7/021* (2013.01);
(Continued)

(58) Field of Classification Search
CPC ......... B21D 1/16; B21D 1/0835; F16C 27/02; F16C 35/077; F16C 35/073; F16C 2370/12; G11B 5/4813
(Continued)

(56) References Cited

U.S. PATENT DOCUMENTS

| 1,469,880 A | 10/1923 | Bowden |
| 2,386,951 A | 10/1945 | Howe |

(Continued)

FOREIGN PATENT DOCUMENTS

| BR | 19201846 A | 1/1993 |
| CA | 2526653 A1 | 12/2004 |

(Continued)

OTHER PUBLICATIONS

"Coefficient of Friction Equation and Table Chart" Engineers Edge; https://www.engineersedge.com/coeffients_of_friction.htm; Dec. 15, 2014 (Year: 2014).*

(Continued)

*Primary Examiner* — Joshua T Kennedy
(74) *Attorney, Agent, or Firm* — Abel Schillinger, LLP; Chi Suk Kim

(57) ABSTRACT

A tolerance ring comprising a metallic band for spring features and a complementary low friction material for frictional considerations is disclosed. The tolerance ring is designed to operate within a precisely controlled torque or axial force band to provide a defined amount of resistance and sliding force control between components that move relative to each other. Isolated portions of the tolerance ring form regions of contact with adjacent ones of the components. Other surfaces of the tolerance ring comprise portions with spring features that have geometry suitable for their spring rate, rather than conforming to mating surfaces of the adjacent components.

18 Claims, 8 Drawing Sheets

Related U.S. Application Data continuation of application No. 12/884,383, filed on Sep. 17, 2010, now abandoned.

(60) Provisional application No. 61/245,883, filed on Sep. 25, 2009.

(51) Int. Cl.
*F16C 27/02* (2006.01)
*F16D 3/06* (2006.01)
*F16D 7/02* (2006.01)

(52) U.S. Cl.
CPC .... *Y10T 156/1041* (2015.01); *Y10T 403/7058* (2015.01); *Y10T 403/7061* (2015.01)

(58) Field of Classification Search
USPC ............... 403/367, 371, 372; 411/520, 521; 384/535, 581; 360/97.02, 265.2, 265.6, 360/266.1
See application file for complete search history.

(56) References Cited

U.S. PATENT DOCUMENTS

| | | | |
|---|---|---|---|
| 2,865,692 A | 12/1958 | Gossmann |
| 3,061,386 A | 10/1962 | Dix et al. |
| 3,094,376 A | 6/1963 | Thomas |
| 3,142,887 A | 8/1964 | Huelck et al. |
| 3,438,660 A | 4/1969 | Steiner |
| 3,465,188 A | 9/1969 | Sisk |
| 3,633,398 A | 1/1972 | Koch |
| 3,700,271 A | 10/1972 | Blaurock et al. |
| 3,747,997 A | 7/1973 | Winn |
| 3,838,928 A | 10/1974 | Blaurock et al. |
| 4,072,368 A | 2/1978 | Ehrentraut |
| 4,079,168 A | 3/1978 | Schwemmer et al. |
| 4,083,622 A | 4/1978 | Neidecker |
| 4,286,894 A | 9/1981 | Rongley |
| 4,617,484 A | 10/1986 | Buijsen |
| 4,647,803 A | 3/1987 | von der Heide et al. |
| 4,790,683 A | 12/1988 | Cramer, Jr. et al. |
| 4,800,623 A | 1/1989 | Brockhaus |
| 4,828,423 A | 5/1989 | Cramer, Jr. et al. |
| 4,889,772 A | 12/1989 | Bergmann et al. |
| 4,916,026 A | 4/1990 | Bergmann et al. |
| 4,932,795 A | 6/1990 | Guinn |
| 4,981,390 A | 1/1991 | Cramer, Jr. et al. |
| 5,003,212 A | 3/1991 | Ibe et al. |
| 5,056,937 A | 10/1991 | Tanaka et al. |
| 5,062,721 A | 11/1991 | Chiba |
| 5,193,917 A | 5/1993 | Adler et al. |
| 5,241,229 A | 8/1993 | Katakura et al. |
| 5,305,654 A | 4/1994 | Durham |
| 5,328,160 A | 7/1994 | McLaughlin |
| 5,609,421 A | 3/1997 | Schulze-Eyssing et al. |
| 5,619,389 A | 4/1997 | Dunfield et al. |
| 5,633,086 A | 5/1997 | Hsu et al. |
| 5,803,614 A | 9/1998 | Tsuji et al. |
| 5,885,006 A | 3/1999 | Sheedy |
| 5,906,029 A | 5/1999 | Fox |
| 5,939,215 A | 8/1999 | Andler |
| 5,964,474 A | 10/1999 | Chen |
| 6,018,441 A | 1/2000 | Wu et al. |
| 6,023,903 A | 2/2000 | Stecker |
| 6,086,257 A | 7/2000 | Lee |
| 6,114,040 A | 9/2000 | Gebregiorgis et al. |
| 6,178,639 B1 | 1/2001 | Lytwynec et al. |
| 6,186,027 B1 | 2/2001 | Nielsen |
| 6,228,471 B1 | 5/2001 | Neerinck et al. |
| 6,288,878 B1 | 9/2001 | Misso et al. |
| 6,294,597 B1 | 9/2001 | Rinde et al. |
| 6,318,898 B1 | 11/2001 | Ward et al. |
| 6,321,712 B1 | 11/2001 | Havel |
| 6,333,839 B1 | 12/2001 | Misso et al. |
| 6,411,472 B1 | 6/2002 | Allsup |
| 6,428,744 B1 | 8/2002 | Takayama et al. |
| 6,480,363 B1 | 11/2002 | Prater |
| 6,499,209 B1 | 12/2002 | Landin et al. |
| 6,512,314 B1 | 1/2003 | Nakanishi |
| 6,516,940 B1 | 2/2003 | Hart et al. |
| 6,527,449 B1 | 3/2003 | Koyama et al. |
| 6,567,266 B2 | 5/2003 | Ives et al. |
| 6,572,270 B2 | 6/2003 | Takemura et al. |
| 6,603,634 B1 | 8/2003 | Wood et al. |
| 6,606,224 B2 | 8/2003 | Macpherson et al. |
| 6,740,428 B2 | 5/2004 | Norito et al. |
| 6,754,046 B2 | 6/2004 | Barina et al. |
| 6,755,746 B2 | 6/2004 | Barnley et al. |
| 6,889,956 B2 | 5/2005 | Gutierrez et al. |
| 6,905,779 B2 | 6/2005 | Sakai et al. |
| 7,007,386 B1 | 3/2006 | Stover |
| 7,085,108 B1 | 8/2006 | Oveyssi et al. |
| 7,118,808 B2 | 10/2006 | Woelki et al. |
| 7,367,107 B1 | 5/2008 | Fruge et al. |
| 7,580,225 B2 | 8/2009 | Hanrahan et al. |
| 7,742,676 B2 | 6/2010 | Tilliette et al. |
| 7,913,835 B2 | 3/2011 | Gautier et al. |
| 7,922,418 B2 | 4/2011 | Baker et al. |
| 7,957,103 B2 | 6/2011 | Woodhead et al. |
| 7,958,637 B2 | 6/2011 | Hughes |
| 8,033,733 B2 | 10/2011 | Lang |
| 8,228,640 B2 | 7/2012 | Woodhead et al. |
| 2002/0024770 A1 | 2/2002 | Hong et al. |
| 2002/0039461 A1 | 4/2002 | Obara et al. |
| 2002/0097937 A1 | 7/2002 | Obara |
| 2002/0118490 A1 | 8/2002 | Macpherson et al. |
| 2002/0123608 A1 | 9/2002 | Howard, III |
| 2002/0172836 A1 | 11/2002 | Takayama et al. |
| 2003/0150140 A1 | 8/2003 | Takayama et al. |
| 2004/0057643 A1 | 3/2004 | Blanchard et al. |
| 2004/0076356 A1 | 4/2004 | Kapaan et al. |
| 2004/0157750 A1 | 8/2004 | Danly, Sr. et al. |
| 2004/0178872 A1 | 9/2004 | Mogi et al. |
| 2004/0246627 A1 | 12/2004 | Durrum et al. |
| 2005/0018936 A1 | 1/2005 | Yoshimura et al. |
| 2005/0051975 A1 | 3/2005 | Takayama et al. |
| 2005/0070365 A1* | 3/2005 | Riefe ............... F16C 3/035 464/162 |
| 2005/0077101 A1 | 4/2005 | Yamamoto et al. |
| 2005/0181216 A1 | 8/2005 | Nakanishi et al. |
| 2005/0225903 A1 | 10/2005 | Sprankle et al. |
| 2006/0165973 A1 | 7/2006 | Dumm et al. |
| 2006/0177685 A1 | 8/2006 | Matsuda et al. |
| 2006/0181811 A1 | 8/2006 | Hanrahan et al. |
| 2006/0214341 A1 | 9/2006 | Sugiura et al. |
| 2006/0228174 A1 | 10/2006 | Woodhead et al. |
| 2006/0245675 A1 | 11/2006 | Lang et al. |
| 2006/0275076 A1 | 12/2006 | Hanrahan et al. |
| 2006/0276246 A1 | 12/2006 | Needes et al. |
| 2007/0000680 A1 | 1/2007 | Adachi et al. |
| 2007/0291417 A1 | 12/2007 | Woodhead et al. |
| 2008/0028591 A1 | 2/2008 | Hughes |
| 2008/0043375 A1 | 2/2008 | Hanrahan et al. |
| 2008/0129044 A1 | 6/2008 | Carcagno et al. |
| 2008/0160300 A1 | 7/2008 | Hwang et al. |
| 2008/0199254 A1* | 8/2008 | Baker ............... F16C 11/04 403/372 |
| 2008/0218008 A1 | 9/2008 | Ghasripoor et al. |
| 2008/0267693 A1 | 10/2008 | Court et al. |
| 2009/0068473 A1 | 3/2009 | Van Wessel et al. |
| 2009/0238504 A1 | 9/2009 | Suzuki et al. |
| 2010/0126823 A1 | 5/2010 | Gautier et al. |
| 2010/0321832 A1 | 12/2010 | Woodhead et al. |
| 2010/0321833 A1 | 12/2010 | Woodhead et al. |
| 2010/0323804 A1 | 12/2010 | Himmelmann |
| 2011/0049834 A1 | 3/2011 | Natu |
| 2011/0076096 A1 | 3/2011 | Slayne et al. |
| 2011/0271512 A1 | 11/2011 | Hughes |
| 2012/0240350 A1 | 9/2012 | Natu et al. |
| 2013/0315654 A1 | 11/2013 | Nias et al. |

(56) References Cited

U.S. PATENT DOCUMENTS

FOREIGN PATENT DOCUMENTS

| | | |
|---|---|---|
| CN | 1126286 A | 7/1996 |
| CN | 1402871 A | 3/2003 |
| CN | 1446294 A | 10/2003 |
| CN | 1459007 A | 11/2003 |
| CN | 101122304 A | 2/2008 |
| CN | 101255884 A | 9/2008 |
| CN | 102630281 A | 8/2012 |
| CN | 103891101 A | 6/2014 |
| CN | 105782340 A | 7/2016 |
| DE | 1872950 | 5/1963 |
| DE | 50166 A1 | 10/1966 |
| DE | 2409856 A1 | 9/1975 |
| DE | 3248148 A1 | 7/1984 |
| DE | 4114643 C2 | 12/1995 |
| DE | 19915417 A1 | 10/1999 |
| DE | 10027513 A1 | 12/2001 |
| EP | 0507544 A1 | 10/1992 |
| EP | 0514329 A2 | 11/1992 |
| EP | 0554144 A1 | 8/1993 |
| EP | 0514329 B1 | 9/1995 |
| EP | 1164300 A1 | 12/2001 |
| EP | 1302684 A1 | 4/2003 |
| EP | 1302685 A1 | 4/2003 |
| EP | 1305530 B1 | 3/2005 |
| EP | 1568437 A2 | 8/2005 |
| EP | 1886895 A1 | 2/2008 |
| EP | 2009145 A1 | 12/2008 |
| EP | 2012025 A1 | 1/2009 |
| EP | 1754646 B1 | 4/2013 |
| FR | 2803126 A1 | 6/2001 |
| FR | 2803127 A1 | 6/2001 |
| FR | 2803129 A1 | 6/2001 |
| GB | 195795 A | 4/1923 |
| GB | 414631 A | 8/1934 |
| GB | 703563 A | 2/1954 |
| GB | 866678 A | 4/1961 |
| GB | 972589 A | 10/1964 |
| GB | 1376563 A | 12/1974 |
| GB | 2382386 A | 5/2003 |
| GB | 2459959 A | 11/2009 |
| JP | S48021050 A | 3/1973 |
| JP | 1981049415 A | 5/1981 |
| JP | 59166711 | 9/1984 |
| JP | 63076908 A | 4/1988 |
| JP | 03048013 A | 3/1991 |
| JP | 04285317 A | 10/1992 |
| JP | 5052222 A | 3/1993 |
| JP | 5052223 A | 3/1993 |
| JP | H0598463 A | 4/1993 |
| JP | H05098463 A | 4/1993 |
| JP | 5126147 A | 5/1993 |
| JP | H05179277 A | 7/1993 |
| JP | H0790533 A | 4/1995 |
| JP | 09060397 A | 3/1997 |
| JP | H09508692 A | 9/1997 |
| JP | H11-115773 A | 4/1999 |
| JP | 2000120663 A | 4/2000 |
| JP | 2000188856 A | 7/2000 |
| JP | 2002213453 A | 7/2001 |
| JP | 2001208082 A | 8/2001 |
| JP | 2003183684 A | 7/2003 |
| JP | 2004-506148 A | 2/2004 |
| JP | 2004513309 A | 4/2004 |
| JP | 2004277565 A | 10/2004 |
| JP | 2004360855 A | 12/2004 |
| JP | 2007502370 A | 2/2007 |
| JP | 2007186149 A | 7/2007 |
| JP | 2007239838 A | 9/2007 |
| JP | 2008-038990 A | 2/2008 |
| JP | 2008069923 A | 3/2008 |
| JP | 2008069924 A | 3/2008 |
| JP | 2008069925 A | 3/2008 |
| JP | 2008095178 A | 4/2008 |
| JP | 2008156690 A | 7/2008 |
| JP | 2008184621 A | 8/2008 |
| JP | 2008531430 A | 8/2008 |
| JP | 2008281017 A | 11/2008 |
| RU | 2219416 C1 | 12/2003 |
| RU | 2329415 C2 | 7/2008 |
| SU | 1646706 A2 | 5/1991 |
| WO | 0141136 A1 | 6/2001 |
| WO | 0159314 A1 | 8/2001 |
| WO | 03025907 A1 | 3/2003 |
| WO | 2004094852 A1 | 11/2004 |
| WO | 2004104268 A1 | 12/2004 |
| WO | 2006056731 A1 | 6/2006 |
| WO | 2011023794 A1 | 3/2011 |
| WO | 2011036126 A1 | 3/2011 |

OTHER PUBLICATIONS

A.R. Slayne; "Performance Characteristics of Actuator/Bearing Joints Made With Tolerance Rings"; Magnetic Recording Conference, 2002. Digest of Asia-Pacific; ISBN: 0-7803-7509-2; pp. WE-P-14-01 to WE-P-14-02; Dec. 10, 2002.

Beer et al.; Mechanics of Materials; section 2.6, Elastic Versus Plastic Behavior of Material; McGraw-Hill Book Co.; pp. 39 to 41 (1981).

Plastic Deformation; <http://www.matter.org.uk/schools/content/hookeslaw/plastic.html>, Materials Teaching Educational Resources, Matter Project, University of Liverpool; 1 page. (1999).

European Search Report for European Patent Application No. 07252993.6 dated Dec. 19, 2007, 7 pages.

European Search Report for European Patent Application No. 09013623.5 dated Jan. 14, 2010, 5 pages.

International Search Report for PCT/GB2004/001681 dated Sep. 13, 2004, 3 pages.

International Search Report for PCT/EP2010/062544 dated Dec. 28, 2010, 12 pages.

International Search Report for PCT/EP2010/063828 dated Dec. 21, 2010, 3 pages.

International Search Report for PCT/GB2005/004067 dated Jan. 26, 2006, 2 pages.

International Search Report for PCT/US2012/030143 dated Oct. 31, 2012, 1 pg.

U.S. Appl. No. 13/427,459, filed Mar. 22, 2012, Inventors: Parag Natu et al., 29 pages.

U.S. Appl. No. 11/718,172, filed May 31, 2007 Inventors: Niki S. Woodhead et al., 24 pages.

U.S. Appl. No. 12/884,383, filed Sep. 17, 2010 Inventors: Andrew Robert Slayne et al., 40 pages.

U.S. Appl. No. 12/549,713, filed Aug. 28, 2009 Inventors: Paruag Natu, 31 pages.

U.S. Appl. No. 10/552,875, filed Oct. 13, 2005 Inventors: Niki S. Woodhead et al., 28 pages.

U.S. Appl. No. 12/870,978, filed Aug. 30, 2010 Inventors: Niki S. Woodhead et al., 23 pages.

U.S. Appl. No. 12/870,984, filed Aug. 30, 2010 Inventors: Niki S. Woodhead et al., 23 pages.

U.S. Appl. No. 12/033,241, filed Feb. 19, 2008 Inventors: Marcus Baker et al., 26 pages.

Andrew Slayne, Declaration Under 37 C.F.R. 1.132 submitted to the United States Patent and Trademark Office (USPTO) for U.S. Appl. No. 12/033,241, signed Oct. 25, 2010, 4 pages.

Extended European Search Report for EP16167392.6, dated Oct. 12, 2016, 2 pages.

* cited by examiner

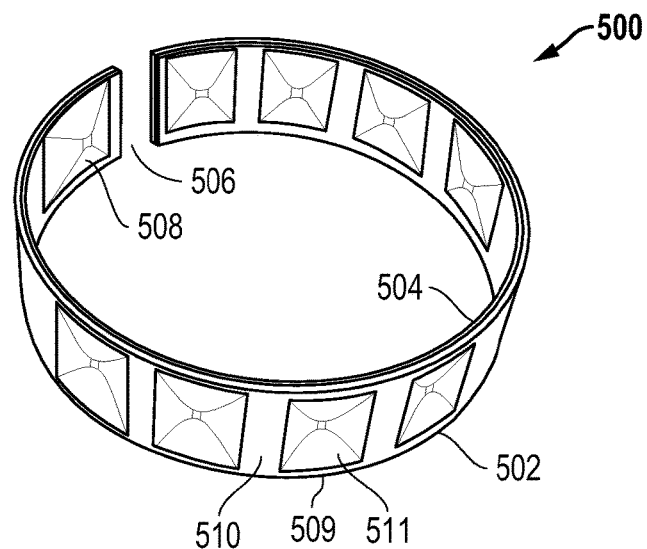
FIG. 5A
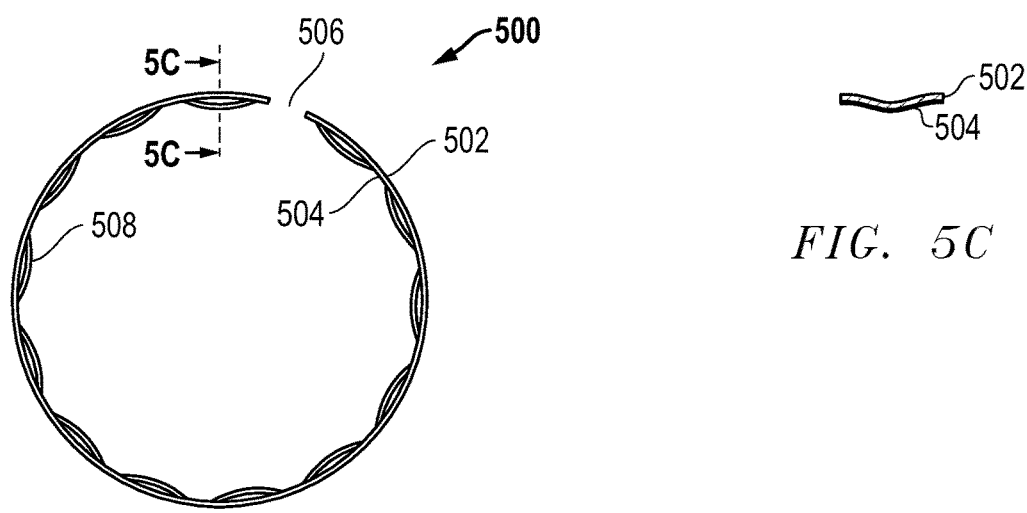
FIG. 5B
FIG. 5C

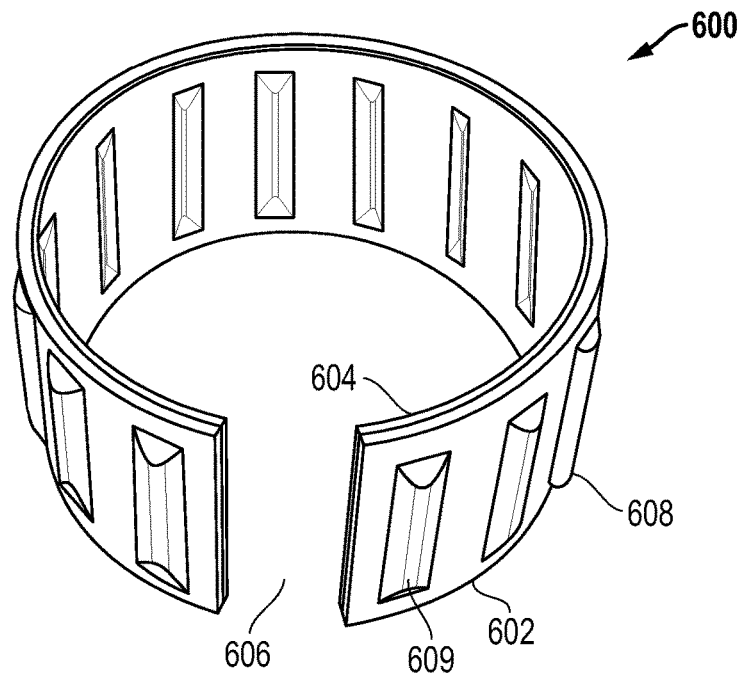
FIG. 6A
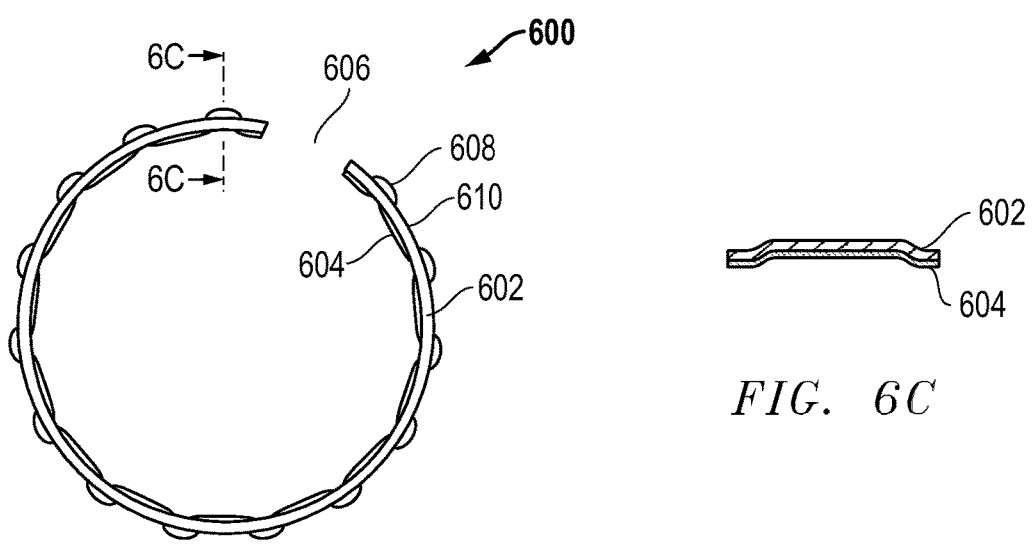
FIG. 6C
FIG. 6B

SYSTEM, METHOD AND APPARATUS FOR TOLERANCE RING CONTROL OF SLIP INTERFACE SLIDING FORCES

CROSS-REFERENCE TO RELATED APPLICATIONS

This application claims priority under 35 U.S.C. § 120 to and is a continuation of U.S. patent application Ser. No. 13/947,789 entitled "System, Method, and Apparatus for Tolerance Ring Control of Slip Interface Sliding Forces," by Andrew R. Slayne and Parag Natu, filed Jul. 22, 2013, which claims priority under 35 U.S.C. § 120 to and is a continuation of U.S. patent application Ser. No. 12/884,383 entitled "System, Method, and Apparatus for Tolerance Ring Control of Slip Interface Sliding Forces," by Andrew R. Slayne and Parag Natu, filed Sep. 17, 2010, which claims priority under 35 U.S.C. § 119(e) to U.S. Provisional Application No. 61/245,883, filed Sep. 25, 2009, entitled "System, Method, and Apparatus for Tolerance Ring Control of Slip Interface Sliding Forces," and having named inventors Andrew Slayne and Parag Natu, all of which applications are incorporated by reference herein in their entireties.

FIELD OF THE DISCLOSURE

The invention generally relates to tolerance rings that are located between moving parts and, in particular, to an improved system, method and apparatus employing a tolerance ring.

BACKGROUND

Tolerance rings constrain movement between relatively moving parts, such as rotating shafts in housing bores. One type of tolerance ring is an annular band located in the gap between the outer surface of the shaft and the inner surface of the bore. This tolerance ring limits radial motion of the shaft within the bore while still permitting rotation.

In conventional tolerance ring configurations, a close fit between the inner and outer components is sought. In addition, either forces for providing maximal frictional engagement or minimal variation in sliding forces are sought. A close fit between the components is desirable because it reduces relative vibration between the parts. These requirements between the inner and outer components require strong and substantial contact, which increases frictional forces.

Tolerance rings that provide torque overload protection for applications with torques greater than 50 Nm, with relatively low rates of rotation and small angular slip cycles also are known. These applications include reduction gear mounts, power steps on four wheel drive trucks and seat motors for fold away seats. Tolerance rings for these applications tend to be heat-treated carbon steel, greater than 0.40 mm thick, and have many strong, high friction waves to provide the required torque. Although these solutions are workable for some applications, improvements in tolerance rings continue to be of interest.

SUMMARY OF THE INVENTION

Embodiments of a system, method and apparatus for a tolerance ring comprise an assembly having an outer component, an inner component located in the outer component and movable relative thereto, and a tolerance ring mounted between the inner and outer components.

In other embodiments, an assembly comprises an outer component, an inner component located in the outer component and movable relative thereto, and a tolerance ring mounted between the inner and outer components. The tolerance ring provides a radial stiffness that is greater than about 20,000 N/mm and parameters selected from the following: a slip torque in a range of 1 to 25 Nm, and a diameter of less than about 40 mm; a slip torque in a range of 1 to 100 Nm, and a diameter of more than 40 mm; or a low resistance to axial sliding in a range of 10 to 600 N, and a diameter of more than 10 mm. Applications having smaller diameters may provide a lower radial stiffness.

In still other embodiments, a tolerance ring assembly comprises an outer component having a bore with an axis therein and an inner component mounted in the bore of the outer component, such that the inner component mates with the outer component and is movable relative thereto. A tolerance ring is located in the bore between the inner and outer components, the tolerance ring comprising a metallic annular band and a low friction material joined to the metallic annular band, the tolerance ring also having a plurality of projections extending relative to the axis, the projections being compressed between the inner and outer components such that the tolerance ring operates in a flattened portion of a compression/retention force characteristic whereby the projections initially exhibit elastic behavior and are plastically deformed, and the tolerance ring provides an overload protection force of less than 100 Nm.

BRIEF DESCRIPTION OF THE DRAWINGS

So that the manner in which the features and advantages are attained and can be understood in more detail, a more thorough description may be had by reference to the embodiments that are illustrated in the appended drawings. However, the drawings illustrate only some embodiments and therefore are not to be considered limiting of the scope.

FIGS. 5A-E are various views of a third embodiment of a tolerance ring constructed in accordance with the invention;

FIGS. 6A-E are various views of a third embodiment of a tolerance ring constructed in accordance with the invention.

The use of the same reference symbols in different drawings indicates similar or identical items.

DETAILED DESCRIPTION OF THE INVENTION

Figure 1:
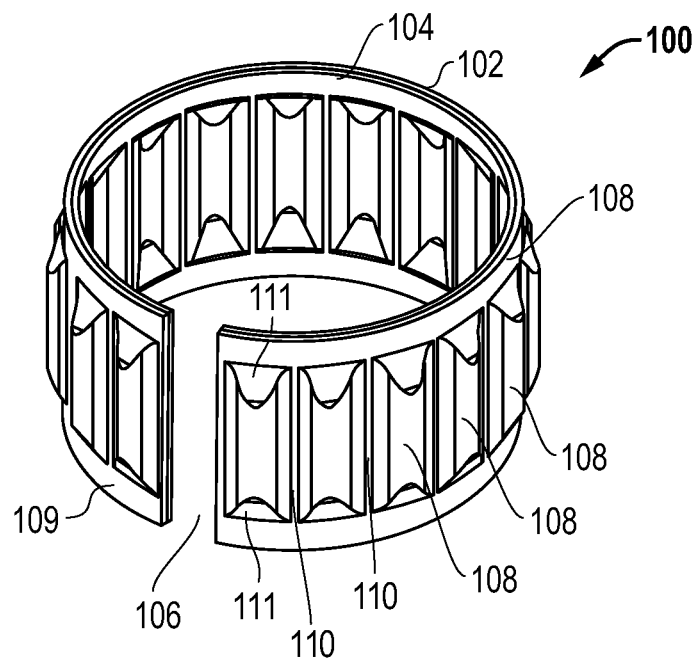
FIG. 1 is a perspective view of one embodiment of a tolerance ring constructed in accordance with the invention.

FIG. 1 depicts a tolerance ring 100 comprising one embodiment. The tolerance ring 100 comprises a band 102 of resilient material (e.g. spring steel) that is curved into a ring-like (substantially annular) shape. The ends of the band 102 do not meet (e.g., it may be formed as a split ring), thereby leaving an axially-extending gap 106 adjacent the circumference of the band. In other embodiments, the band may be curved so that the ends overlap with one another. In yet further embodiments, the band may be a continuous, unbroken ring. The inner surface of the tolerance ring 100 has a low friction layer 104 that conforms to the shape of the band.

The tolerance ring 100 has a plurality of spaced projections 108 that extend radially outward from the outer surface of the tolerance ring 100. There is a flat, circumferentially-extending rim 109 of material at each axial end of the projections 108. Each projection 108 also is separated from its neighboring projections by a flat section 110 of the tolerance ring 100, which may be contiguously formed with rims 109. The projections 108 are axially-elongated ridges that are similar in shape to waves used on conventional tolerance rings. The peak of each ridge is rounded, and the axial ends of each ridge terminate at a tapered shoulder 111.

In some embodiments, the tolerance ring 100 may be formed from a flat strip of resilient material (which forms the band 102). Before the strip is bent into its curved shape, and before the projections are formed, the low friction layer 104 is laminated onto one surface thereof. In other embodiments, the low friction layer 104 may be laminated onto both surfaces of the flat strip. After the low friction layer 104 is attached to the flat strip, the resulting layer structure is stamped (e.g., pressed using a suitably shaped mold, rotary wave forming, etc.) to form the projections 108. Thus, the projections 108 are formed from both the strip of resilient material and from the low friction layer 104. The material of the low friction layer 104 may be chosen to be flexible to facilitate this stamping step. In the embodiment shown in FIG. 1, the projections 108 project radially outward from the band 102. In other embodiments they may project radially inward from the low friction layer 104. After the projections 108 are formed, the layered structure is curved into the ring-like configuration shown in FIG. 1. In the embodiment shown, the band 102 is the outer material. In other embodiments, the band 102 may be the inner material. In still other embodiments the projections 108 may extend radially inward or outward depending on the particular situation and independently of whether the band 102 provides the inner or outer material for the tolerance ring 100.

In operation, the tolerance ring 100 is located between two components. For example, it may be located in the annular space between a shaft and a bore in a housing. The projections 108 are compressed between the inner and outer components. Each projection acts as a spring and deforms to fit the components together with zero clearance therebetween. In other words, the inner component contacts the inner surfaces of the tolerance ring and the outer component contacts the outer surfaces of the tolerance ring.

If forces (e.g., rotational or linear) are applied to one or both of the inner and outer components such that there is a resultant force between the inner and outer components, the inner and outer components can move relative to each other. Since some embodiments have zero clearance between the components, there are a pair of contacting surfaces that slide relative to each other. This is the slip interface. In some embodiments, the slip interface occurs at the surfaces of contact between the low friction layer 104 and the inner component (see, e.g., FIG. 3). The surfaces of contact may include the inner surfaces of the flat rims 109 and the "footprints" of each projection 108 (i.e., the regions around the edges of each projection 108 where they meet the band 102). The material for the low friction layer 104 and the configuration of the projections 108 provide a slip force at the slip interface that is substantially lower than an expected value derived from the radial load force transmitted by the projections. This low slip force facilitates motion between the moving contact surfaces.

In contrast, at the surfaces of contact between the outer component and the outer surfaces of the band 102, there may be sufficient frictional force to retain the tolerance ring 100 in place relative to the outer component. In other embodiments, both surfaces of the band 102 may be laminated with a low friction layer. Thus, there may be two slip interfaces in such embodiments.

Figure 2:
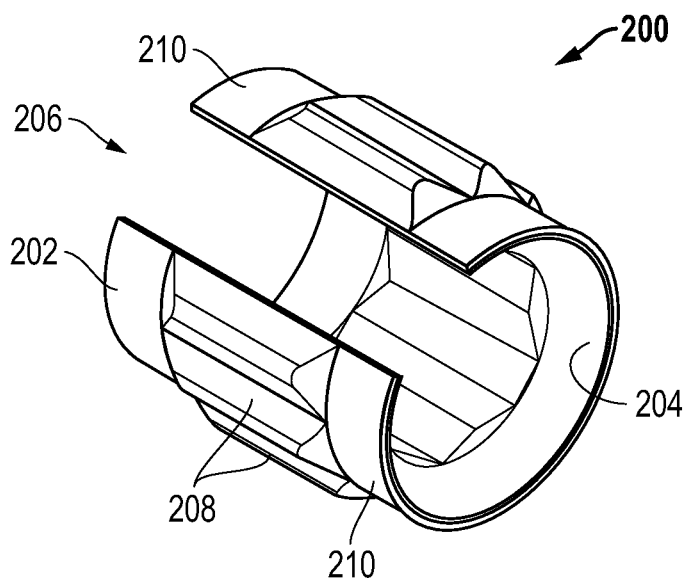
FIG. 2 is a perspective view of another embodiment of a tolerance ring constructed in accordance with the invention.

FIG. 2 depicts another embodiment of a tolerance ring 200 comprising a band 202 curved into a tubular configuration with an axial gap 206 in its circumference. In a similar way to FIG. 1, the inner surface of the band 202 has a low friction layer 204 laminated thereon. The band 202 also has a plurality of projections 208 that extend radially outward from its outer surface. The projections 208 may circumferentially abut one other as shown, or be circumferentially spaced-apart as in the embodiment of FIG. 1. The tolerance ring 200 may be manufactured in a manner as outlined above, so the low friction layer 204 conforms to the shape of the band 202, including indentations that match the various undulations of the projections 208. The tolerance ring 200 includes flat rims or collars 210 at each axial end of the projections 208.

The tolerance ring 200 shown in FIG. 2 differs from the one depicted in FIG. 1 in that, for example, there are fewer projections around the circumference of the band and there are virtually no flat spaces between the neighboring projections.

Figure 3:
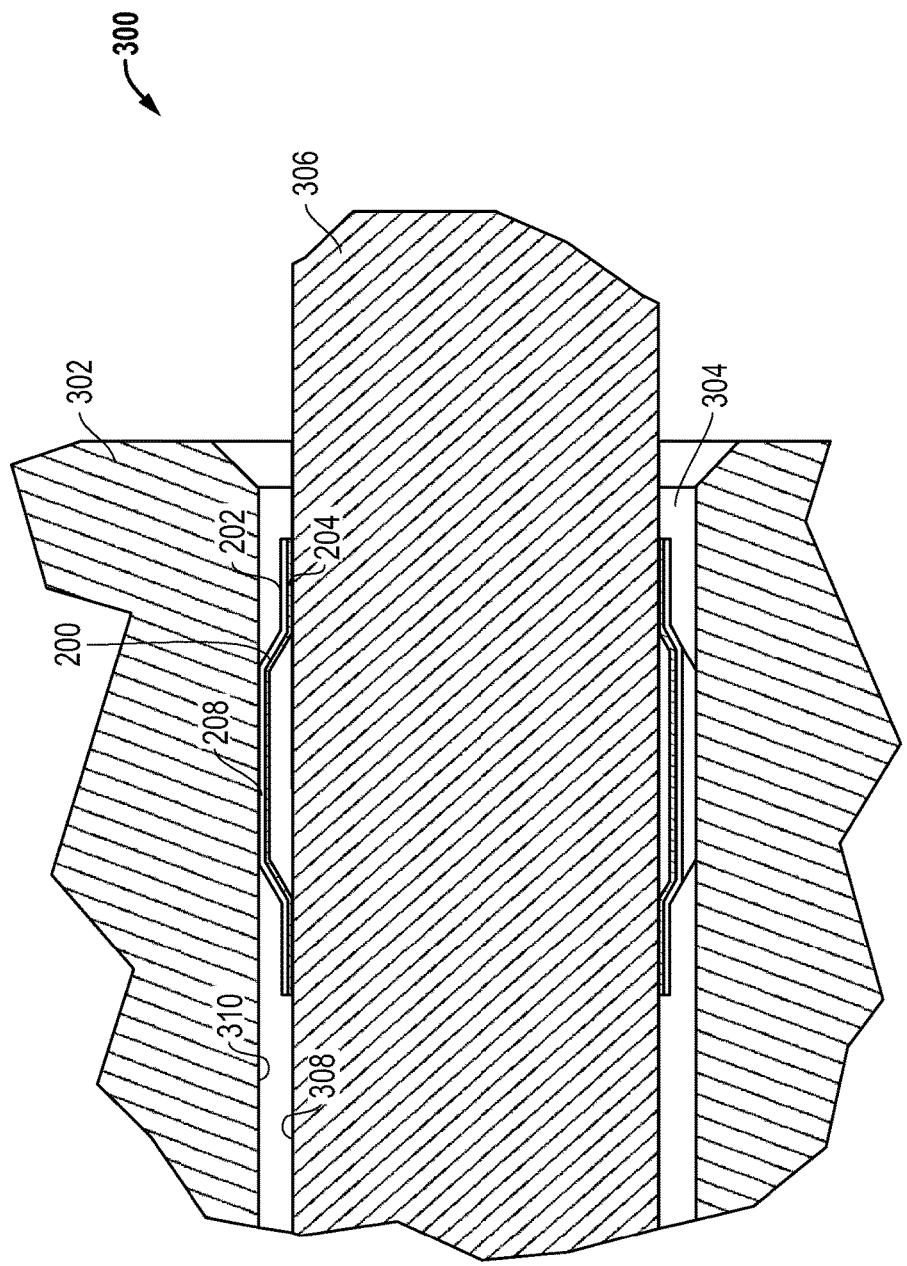
FIG. 3 is an axial sectional view of the ring of FIG. 2 in an apparatus.

FIG. 3 depicts an axial sectional view through an apparatus 300 comprising another embodiment. The apparatus 300 incorporates, for example, the tolerance ring 200 shown in FIG. 2. The apparatus 300 comprises a housing 302 or outer component. The housing 302 has an axial bore 304 formed therein, which receives a shaft 306 or inner component. Tolerance rings may be used to transfer torque or as torque limiters in such applications.

An annular gap exists between the outer surface 308 of shaft 306 and the inner surface 310 of bore 304. The size of this annular gap is variable because the diameter of the shaft 306 and bore 304 may vary within manufacturing tolerances. To prevent vibration of the shaft 306 within the bore 304, the annular gap is filled by tolerance ring 200 to form a zero-clearance fit between the components. FIG. 3 shows that the tolerance ring 200 comprises a band 202 as an outer layer and a low friction layer 204 as an inner layer that conforms to the shape of band 202. In use, the circumferential projections 208 of the tolerance ring 200 are radially compressed in the annular gap between the shaft 306 and housing 302, such that the band 202 contacts the inner surface 310 of the bore 304. The slip interface is formed where the low friction layer 204 contacts the outer surface 308 of the shaft 306. The tolerance ring 200 therefore reduces the gap to zero so there is no clearance between the components in apparatus 300.

The contact area between outer surface 308 and low friction layer 204 is a slip interface at which relative motion between the shaft 306 and the tolerance ring 200 occurs. The tolerance ring 200 is secured relative to the housing 302 by frictional engagement at the contact area between the band 202 and the inner surface 310.

If, through use, wear of the shaft 306 or low friction layer 204 occurs at the slip interface, the projections 208 may compensate by resiliently moving toward their rest state, thereby maintaining contact with the shaft 306 and housing 302. The lifetime of tolerance ring 200 may therefore be superior to conventional, zero clearance tolerance rings without resiliently compressible projections.

Figure 4:
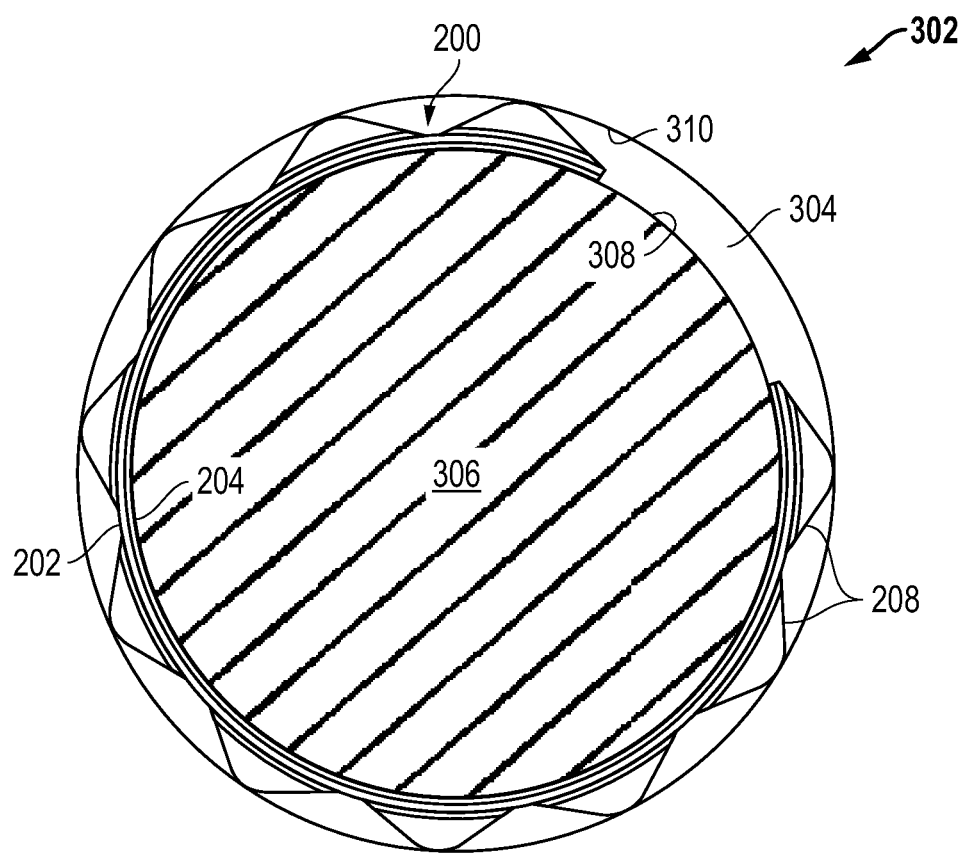
FIG. 4 is a radial sectional view of the ring of FIG. 3 in the apparatus.
Figures 5D, 5E:
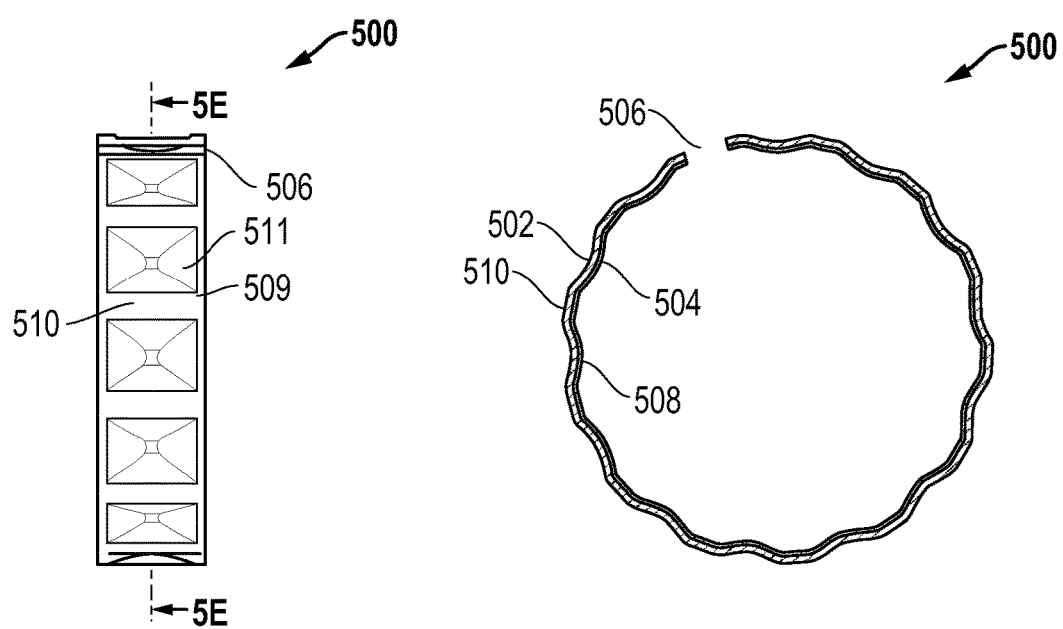
Figures 6D, 6E:
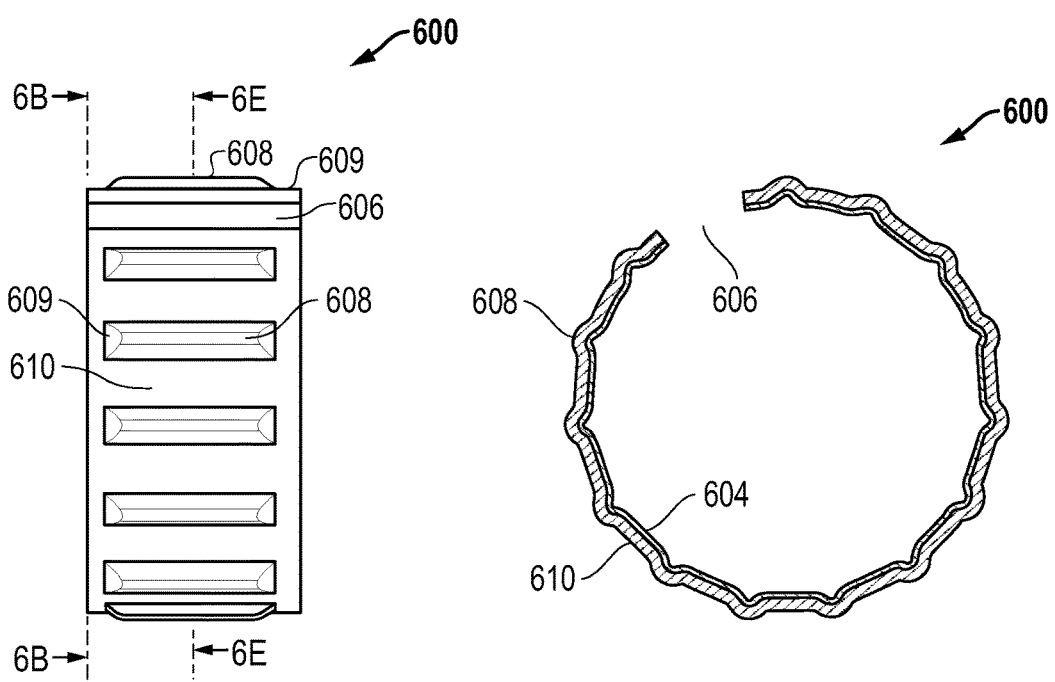

FIG. 4 illustrates a radial sectional view of the apparatus comprising housing 302 and shaft 306. In the embodiment shown, the tolerance ring 200 is retained on the shaft 306. The outer diameter of the shaft 306 is greater than an inner diameter of the tolerance ring 200 at rest. Thus, the tolerance ring must expand (axial gap 206 (FIG. 2) must widen) to fit the tolerance ring around the surface 308 of the shaft. Inside the bore 304 of housing 302, the projections 208 are compressed in the annular gap or space between the components at inner surface 310. In this configuration, the coefficient of friction at the slip interface (between shaft 306 and low friction layer 204) is very small compared to the coefficient of friction at the contact area between the band 202 and housing 302. Thus, slipping is substantially limited to and occurs substantially freely at the slip interface. In other embodiments, the arrangement of the projections 208 and low friction layer 204 may be such that the slip interface is between the housing 302 and the tolerance ring 200.

FIGS. 5A-E depict various perspective, sectional, axial end and side views of another embodiment of a tolerance ring 500. Tolerance ring 500 comprises a band 502 curved into a tubular configuration with an axial gap 506 in its circumference. The inner surface of the band 502 has a low friction layer 504 laminated thereon. The band 502 also has a plurality of projections 508 that extend radially inward. The tolerance ring 500 may be manufactured as described herein, so the low friction layer 504 has a uniform thickness and conforms to the shape of the band 502, including indentations that match the various undulations of the projections 508. The tolerance ring 500 may include tapered shoulders 511 and flat circumferential rims or collars 509 at each axial end of the projections 508, as well as flat spaces 510 between projections 508.

FIGS. 6A-E depict views of yet another embodiment of a tolerance ring 600. The tolerance ring 600 comprises a band 602 of resilient material that is curved into an annular) shape. In the embodiment shown, the ends of the band 602 do not meet and leave a gap 606, but it may be formed as a continuous ring. The inner surface of the tolerance ring 600 has a low friction layer 604 laminated thereon, such as PTFE, which conforms to the band 602.

The tolerance ring 600 has a plurality of spaced projections 608 that extend radially outward from the outer surface of the tolerance ring 600. There is a flat, circumferentially-extending rim 609 at each axial end of the projections 608. Each projection 608 also is separated from its neighboring projections by a flat section 610, which may be contiguously formed in a planar fashion with rims 609. The projections 608 are axially-elongated ridges, with the peak of each ridge being rounded, and the axial ends of each ridge terminating at a tapered shoulder 611.

In some embodiments, the tolerance ring 600 may be formed from a flat strip of resilient material as band 602). Before the strip is bent into its curved shape, and before the projections are formed, the low friction layer 604 is laminated onto one surface thereof. In other embodiments, the low friction layer 604 may be laminated onto both surfaces of the flat strip. After the low friction layer 604 is attached, the resulting layered structure is stamped to form the projections 608. Thus, the projections 608 are formed from both the strip of resilient material 602 and from the low friction layer 604. The material of the low friction layer 604 may be chosen to be flexible to facilitate this stamping step. Although the projections 608 project radially outward from the band 602, they may project radially inward from the low friction layer 604. After the projections 608 are formed, the layered structure is curved into the ring-like configuration. In the embodiment shown, the band 602 is the outer material, but it may be the inner material. In still other embodiments the projections 608 may extend radially inward or outward depending on the particular situation and independently of whether the band 602 provides the inner or outer material for the tolerance ring 600.

In some embodiments for overload protection applications, tolerance rings with torque overload protection forces of, for example, less than 25 Nm and with an overall diameter of less than 40 mm are provided. Applications for these embodiments include, for example, seat adjusters, hybrid dual clutch mechanisms, seat headrest adjustment, door actuators, tire winches, etc.

Still other embodiments provide torque overload protection forces of, for example, less than 100 Nm at diameters greater than 65 mm, such as for applications including starter motors, power train applications, etc. These designs may utilize a stainless steel band with a thickness of less than 0.40 mm in some embodiments. Other embodiments may include diameters of, e.g., 40 to 65 mm with intermediate ranges of torque overload protection. Moreover, no lubricant is required, which is particularly advantageous for applications that must be grease-free for either technical or aesthetic reasons.

In some embodiments, the tolerance ring is formed from spring steel (e.g., cold rolled stainless steel) and has had a low friction layer laminated thereto. For example, the stainless steel may be 0.1 to 0.7 mm thick, and the low friction may be in a range of about 0.05 to 0.50 mm thick (e.g., 0.25 mm) and bonded to the steel before the tolerance ring is formed into its circular shape.

The tolerance ring may be formed with geometrical wave that are designed to achieve spring characteristics as required for the particular force control application intended. The low friction layer lowers the sliding forces, reduces force variation, and provides a low friction slip surface that withstands many slips without wear on the underlying materials. This allows tolerance rings to be designed to fulfill force control functions not possible within the usual envelope of performance achieved by variation of tolerance ring geometry alone, such as low slip torque, low sliding force, with little force degradation over many slip cycles. For example, a tolerance ring in accordance with the invention reduces sliding force or torque to approximately one-half to one-third of what would be expected for an equivalent design, metal-only tolerance ring. As a result, the embodiments disclosed herein are much more stable than prior art designs.

In this disclosure, slip torque is defined as the torque at which two components that are joined by a tolerance ring begin to rotate with respect to each other due to any applied torque loading to the system. The tolerance ring fixing will hold the mating components together without relative rotation until this threshold value is reached, at which point the frictional forces generated by compression of the tolerance ring waves will be overcome and respective rotation will occur, resisted by the frictional forces. Similarly, axial sliding force is the same thing, but in an axial direction. The tolerance ring will only permit axial sliding between two components if the threshold force value is exceeded. The threshold force is generated by the frictional forces generated by compression of the tolerance ring waves. Overload protection force, or torque, occurs where the tolerance ring slip torque or sliding force is set to be below the safe capacity of the system. The tolerance ring permits slippage if the system receives an external load, above the threshold value, that may otherwise have caused damage to the system.

Accordingly, embodiments of the tolerance ring waves have a greater height than the radial space into which they are to be assembled. Thus, as a result of assembly, the waves are compressed and exert a force dependent on their stiffness and the amount of compression, which is how they generate the force to hold the assembly together.

Typically, the mating components of the assembly and the tolerance ring waves themselves have dimensional variability within given tolerances. Thus, the actual amount of compression of the waves, and hence the forces generated in the assembly, can vary from assembly to assembly. However, if the waves are compressed beyond their 'elastic zone' they behave progressively more plastically, limiting further increase in force from any further compression. This effect is important where tolerance rings provide sliding force control (either axially or rotationally) to minimize force variation due to compression variation, where the waves are designed to be compressed into their 'plastic zone.'

For example, in axial sliding force control applications requiring low forces, such as axial sliding forces in a range of about 30 to 300 N (and, in some embodiments, 10 to 600 N) with component diameters of at least about 10 mm, and in torque limitation applications requiring slip torque in a range of about 1 to 25 Nm with components of less than about 40 mm diameter and a radial stiffness that is greater than about 20,000 N/mm, or a slip torque in a range of about 1 to 100 Nm with component diameters of more than about 40 mm diameter and a radial stiffness that is greater than about 20,000 N/mm, it is very difficult to achieve consistent sliding forces with conventional tolerance ring designs. To achieve such low forces, thin materials and 'weak' wave geometry are needed in order to approach plastic spring performance, resulting in very flimsy structures that are difficult to handle and, once assembled, have very low radial stiffness.

For example, in one experiment a conventional tolerance ring comprising a simple steel ring, and a tolerance ring constructed in accordance with the invention low friction layer on an identical steel ring were compared. Thus, the steel ring geometry was the same for both rings, e.g., a 35 mm diameter, a 12 mm width and a 0.2 mm thickness, in which waves (e.g., 9 waves per ring) having a 1 mm height were pressed, with wave-spacing being identical for both steel rings. The only difference in this experiment was that the improved tolerance ring also included a PTFE ring having an additional 0.25 mm thickness, in accordance with the invention. Thus, the PTFE ring comprised a 0.2 mm steel thickness plus a 0.25 mm PTFE thickness. The spring stiffness for the conventional steel-only ring and the PTFE-laminated ring were approximately identical, as the PTFE has very little effect on the shape of the load deflection curve if the steel wave geometry is maintained. The sliding forces for these two experimental designs reached 1000 N for the steel-only tolerance ring, but only 400 N for the PTFE-laminated ring. Although the steel-only ring had just 0.2 mm thickness, the sliding forces are much higher because of the higher friction coefficient without PTFE, and the wear that occurs during relative motion.

As another example and comparison of tolerance rings in a torque slip application, tolerance rings having diameters of 20 mm, widths of 18 mm, a wave height of 1 mm, and a wave-to-wave spacing of 7 mm were tested. The application had a target slip torque of 4 Nm. To achieve this target goal, a tolerance ring in accordance with the invention was formed from a band of stainless steel material and had a thickness of 0.4 mm, plus a PTFE-laminated layer with a thickness of 0.25 mm This embodiment produced the slip torque of only 4 Nm, but had a very significant radial stiffness to an externally-applied load of about 50,000 N/mm.

In contrast, producing a target slip torque of only 4 Nm with a conventional steel-only tolerance ring required the thickness of the steel to be reduced to only 0.2 mm. As a resultant, the radial stiffness of this conventional design was a mere, by comparison, 12,000 N/mm. Thus, to achieve the target slip torque, the thickness had to be reduced which rendered a radial stiffness that was less than a fourth of that achievable by the present embodiment of the invention. This experiment demonstrates that embodiments of the invention provide a much stiffer assembly in low torque slip application, which is particularly important when external loading is required to be resisted. Moreover, in practice the conventional metal-only tolerance ring quickly fails in applications where multiple slips are required, due to the significant wear on its steel-only contact surfaces.

Conventional reductions in sliding force also were possible by reducing the number of waves, spacing the waves further apart, and/or reducing the raw material thickness to about 0.1 mm to reduce the stiffness of each wave. None of these conventional solutions to reducing sliding force are viable. These simple methods also detrimentally reduce the overall radial stiffness of the assembly, so the result is far less stable and less able to withstand external radial loading without undue deflection.

Maintaining the wave stiffness but reducing the number of waves results in the same force per wave, so the same wear problems occur as prior art designs without a low friction layer. Moreover, reducing the thickness of the steel to 0.1 mm results in a very flimsy ring that causes significant handling and assembling difficulties.

The addition of the low friction material onto the surface of the tolerance ring on which the sliding occurs has the effect of lowering the contact friction coefficient and lowering the resultant sliding forces. For example, the coefficient of friction provided by the low friction layer may be in a range of about 0.04 to 0.25, and about 0.09 to 0.17 in other embodiments. This design also avoids wear of the component surfaces during slip, maintaining sliding forces over many slip cycles. With lowered forces, the tolerance ring geometry can be made more robust for the same force levels than would be possible with conventional tolerance rings. The flow of the low friction material in the contract areas also has the effect of helping minimize sliding force variation by plastically deforming within itself, thereby providing a more consistent force control.

Applications for such embodiments include, for example, axial sliding force control (e.g., in steering column 'tube-in-tube' length adjustment sliding mechanisms), torque overload protection in driven mechanisms (e.g., automotive applications such as seat positioners, door mechanisms, etc.) The low friction layer is on the surface of the tolerance ring that is adjacent to the surface that will slip. It may be on the top or the bottom of the waves depending on the application and the configuration of the assembly. Alternative low friction materials and/or thicknesses may be used depending on the required properties, such as contract pressures, slip speeds, and desired lubrication or wear characteristics.

The low friction layer may comprise many types of materials including, for example, a polymer, such as a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof. In an example, the thermoplastic material includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the thermoplastic material includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the material includes polyketone, such as polyether ether ketone (PEEK), polyether ketone, polyether ketone ketone, polyether ketone ether ketone ketone, a derivative thereof, or a combination thereof. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. In an additional example, the thermoplastic polymer may be ultra high molecular weight polyethylene. An exemplary solid lubricant may include polytetrafluoroethylene or a solid lubricant selected from molybdenum disulfide, tungsten disulfide, graphite, graphene, expanded graphite, boron nitride, talc, calcium fluoride, cerium fluoride, or any combination thereof. An exemplary ceramic or mineral includes alumina, silica, titanium dioxide, calcium fluoride, boron nitride, mica, Wollastonite, silicon carbide, silicon nitride, zirconia, carbon black, pigments, or any combination thereof.

In some embodiments, the steel side of the tolerance ring remains stationary against the other surface, in some embodiments. Retention features such as flanges, tabs, scallops, flares or other devices may be incorporated to anchor the steel surface to the mating component to avoid slip.

In some embodiments, the tolerance ring provides zero clearance with low slip force for rotational or axial movement. In one aspect, the tolerance ring combines a low friction layer to promote slipping with a tolerance ring to provide engagement across a gap between two components that move relative to each other. The structure is compressible and presents the additional advantages of being operable in a variety of gap sizes (e.g., to compensate for manufacturing variations in the dimensions of the components) and present a smaller contact area than conventional tolerance rings. In combination with the low friction layer, this design provides a significant reduction in frictional forces that oppose relative motion between the components even when the axial or radial load is high.

Another advantage of the tolerance ring structure is its resilience. Without the low friction layer, wear due to multiple slips would occur and the sliding force would change. With the low friction layer, however, wear is prevented. The low friction layer wears instead of the mating components. The tolerance ring spring effect takes up the wear in the PTFE, maintaining zero clearance and helping maintain force levels.

The ring typically includes one or more flat circumferentially extending rims, such as at the axial edges of the ring, and a series of circumferentially spaced-apart projections extending substantially in radial directions. The projections extend radially from the ring either outwardly away from the ring, or inwardly toward the radial center of the ring. The projections may be discrete formations. They may be regular formations, such as ridges, waves or fingers. Each projection may comprise a rounded ridge (e.g., wave) that rises to and falls from a radial peak. In such embodiments, the force transmitted by the projection is concentrated in a small region around the edges where it meets the band (i.e., its "footprint").

In use, each projection acts as a spring and exerts a radial force against the components, thereby providing an interference fit between them. Rotation of the inner or outer component produces similar rotation in the other component as torque is transmitted by the ring. Likewise, linear or axial movement of either component produces similar linear movement in the other component as linear force is transmitted by the ring.

It is known to provide tolerance rings that allow slipping between components in exceptional circumstances. For example, if relatively high forces (e.g., rotational or linear) are applied to one or both of the inner and outer components such that the resultant force between the components is above a threshold value. In conventional tolerance rings that threshold value is high and is based on an expected value based on the radial load force experienced by the ring.

According to one aspect, there may be provided a system comprising an inner component, an outer component arranged to receive the inner component, and a tolerance ring mounted between the inner and outer components to effect mating engagement therebetween. The tolerance ring may comprise a deformable band of a first material, the band having a flat circumferentially extending rim and a plurality of circumferentially spaced radially extending projections, and a low friction layer of a second material having a lower coefficient of friction than the first material to provide a slip interface to permit relative motion between the inner and outer components. In use, the band provides a zero clearance fit between the inner and outer components by transmitting a load force therebetween. However, the low friction layer functions to reduce frictional force at the slip interface such that a slip force required to move the inner and outer components relative to each other is significantly less than an expected value derived from the load force.

The flat rim of the band may provide a circumferentially extending contact surface with one of the inner and outer components. A consistent region of contact around the circumference of the tolerance ring can improve control over the slip force. There may be two or more rims on the band, with multiple bands of waves in some embodiments. A rim may be provided at each axial end of the tolerance ring, with the projections being located between the rims.

The projections may be arranged to project away from the rim to provide a plurality of discrete contact surfaces with the other of the inner and outer components. The projections may be configured to deform. This may include elastic deformation at the discrete contact surfaces to transmit the load force radially through the tolerance ring between the inner and outer components. The shape and size of each projection may be selected based on the particular application. The slip force may depend on the shape of the projections. Typically, tolerance ring projections or waves are capable of transmitting relatively high radial forces (e.g., 200 N or more) to locate stably and provide radial stiffness between the inner and outer component. Each projection comprises a footprint region where its edges meet the band. The slip interface may be at the load transfer point between a footprint region and one of the inner and outer components. For example, this may occur between the tolerance ring and the one of the inner and outer components that contacts the rims. The area of the footprint region may be relatively small, which, in combination with the low friction layer, reduces the frictional forces.

In some embodiments, the projections are self-contained structures. For example, each projection may comprise a circumferentially extending rounded ridge with tapered shoulders at its axial ends. When the tolerance ring is mounted on the inner or outer component in a pre-assembly, the tapered shoulders act as guides to aid axial installation of the other component.

The projections are carefully selected and designed for their force transfer or spring properties. The geometry of the projections is selected to provide desired elastic/plastic deformation characteristics. The deformation characteristics are selected not only to take account of the manufacturing tolerances of the inner and outer components, but also to compensate for differential thermal expansion and wear that may occur between dissimilar components in operation, thus ensuring the desired performance is achieved throughout. These designs are applicable to zero clearance tolerance rings to ensure that the assembled components do not become loose at elevated temperatures.

In use, the band of the tolerance ring may deform elastically when mounted on one of the components as a pre-assembly. When the other of the components is mounted on the pre-assembly, thereby compressing the ring in the gap between the components, preferably only the projections deform. This deformation may be elastic or plastic, depending on the shape and/or profile of the projections and the size of the gap. If only the projections deform in this way, the force transmitting contact area at the slip interface is not substantially altered when the ring is compressed. This enables a consistent slip force to be achieved.

The low friction layer may be integral with or attached to the band, and conforms in shape to the band. For example, the low friction layer mold with and match the projections on the band. This feature enables a compact construction. The low friction layer comprises a series of discrete patches attached to or laminated on the band. For example, the low friction layer may be provided at contact points at the slip interface. In one embodiment, patches of low friction material are attached to the band at the footprint regions and the rims. The band may be exposed where there is no contact at the slip interface.

The low friction layer may be attached to a surface of the band facing the inner or outer component. The low friction layer may be coated or bonded to the band. In one embodiment, the low friction layer is laminated on the surface of the band. Laminating the low friction layer provides an even thickness around the band to avoid thin patches that may occur if the layer is coated by immersing the band in a liquid form of the second material and spinning or otherwise shaking off the excess.

In some embodiments, the tolerance ring is secured on one of the inner or outer components, whereby the slip interface is between the ring and the other of the components. For example, the tolerance ring may be secured or retained by resilient gripping of the band on the inner component. In this example, the low friction layer is provided only on the inner surface of the band and the projections may extend radially outwardly from the band, e.g., toward the outer component. With this arrangement, the slip interface is at the contact area between the inner surface of the tolerance ring and the inner component, where the footprints of the projections and the rims of the tolerance ring contact the inner component.

The tolerance ring is secured by frictional engagement of the band on one of the components. In split ring embodiments, the split ring is resilient so as to grip one component (e.g., a shaft) that is larger than its diameter, or expand outward against an outer component (e.g., a bore in a housing) that is smaller than its diameter. It may be desirable to permit relative movement between the inner and outer components in only one sense (e.g., rotational or axial). In this case, the tolerance ring may be mechanically constrained with respect to one of the components to prevent relative movement at the slip interface in the undesired sense. For example, the tolerance ring may clip into an external groove on the outer surface of a shaft. The edges of the groove prevent axial movement of the tolerance ring relative to the shaft. If the slip interface is provided on the inner surface of the tolerance ring, relative axial movement of the shaft and bore at that interface is prevented and must instead occur at the outer surface of the tolerance ring. The outer surface may not have the low friction layer and may therefore provide more resistance to relative motion.

The band may comprise a resilient split ring, such as an open loop of material extending partly around the perimeter of the inner component. The configuration of projections may be symmetrical around the circumference of the ring with respect to the split. This arrangement may be particularly stable.

The inner component may be a shaft and the outer component may be a housing having a bore for receiving the shaft. The tolerance ring extends around the perimeter of the shaft to engage the outer surface of the shaft and the inner surface of the bore. As mentioned above, the band may extend entirely around the perimeter of the shaft or only partly around the shaft.

The apparatus also may include a drive unit arranged to cause relative rotation between the shaft and the housing, wherein the ring is arranged to permit circumferential slipping between the outer surface of the shaft and the inner surface of the bore.

The low friction layer may have substantially the same circumferential extent as the band. The low friction layer may be provided at all contact points between the ring and inner/outer component at the slip interface. The band therefore does not contact the component that is moving relative to it at the slip interface, which can reduce friction.

Each indentation may be located opposite a projection. For example, the projections may be formed by stamping, pressing or roll-forming a strip of material such that indentations are automatically formed in the backside of the strip when the projections are made.

Where the projections are self-contained, discrete structures having walls that enclose a volume when mounted between the inner and outer components, they may retain any grease applied before assembly and reduce or minimize subsequent leakage.

According to another aspect, there may be provided a tolerance ring for mounting between inner and outer components to effect mating engagement therebetween. The ring comprises a deformable band of a first material, the band having a flat circumferentially extending rim and a plurality of circumferentially-spaced, radially-extending projections, and a low friction layer of a second material having a lower coefficient of friction than the first material to provide a slip interface to permit relative motion between the inner and outer components. The ring may have any of the features discussed above with respect to other aspects.

According to still another aspect, there may be provided a method of forming a tolerance ring for mounting between components to effect mating engagement therebetween, the method comprising: attaching a layer of slip material to a strip of base material to form a layered structure, the slip material having a lower coefficient of friction than the base material; forming a plurality of spaced projections across the layered structure adjacent to a flat region; bending the layered structure to form a ring, wherein the flat region becomes a circumferentially-extending rim and the plurality of projections extend radially from the layered structure.

The base material again may be material suitable for forming a tolerance ring, such as spring steel or the like. The slip material may be laminated on to the base material to attach it thereto. Laminating has an advantage in some applications because the attached layer has a consistent thickness. The thickness of the laminated layer may be selected to ensure that material performance does not degrade if there is any wear at the slip interface. The slip material may be any material suitable for forming the low friction layer discussed above. The plurality of projections may be formed by stamping, pressing or roll-forming the layered structure.

Embodiments also are distinguished over conventional designs that merely change the pitch and/or depth of their corrugations to achieve a degree of resilience to avoid excessive torque. With embodiments of the present tolerance ring, the design operates within a well-defined torque band (e.g., with maximum and minimum values) to functionally provide a defined amount of controlled resistance. This design provides a means of torque or axial force limitation within defined bands. Thus, it provides a high degree of precise control of force, rather than a mere specification of resilience for radial compensation. Embodiments of the tolerance ring combine specific spring characteristics of the metallic band with the friction and wear characteristics of a selected low friction layer, into a tolerance ring that extends the performance envelope of tolerance designs into the precise bandwidth control of lower force, multi-slip applications that previously were not possible.

Figure 7:
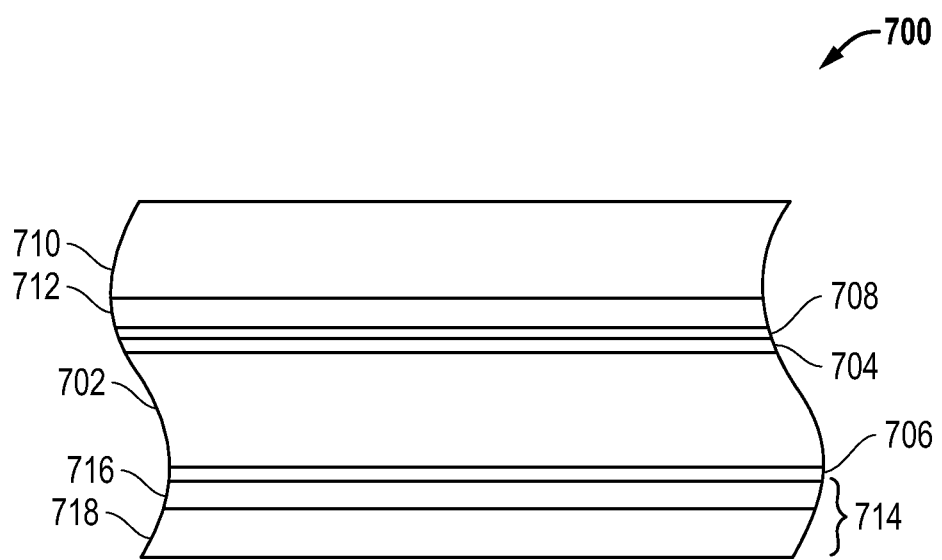
FIG. 7 is a schematic sectional side view of another embodiment of a tolerance ring having corrosion resistance layers and is constructed in accordance with the invention.

FIG. 7 is a sectional view of another embodiment illustrating various layers of a corrosion resistant tolerance ring 700. Tolerance ring 700 can include a load bearing substrate 702, such as a metallic support layer (e.g., an annular band). The metallic support layer can include a metal or metal alloy such as steel including carbon steel, spring steel, and the like, iron, aluminum, zinc, copper, magnesium, or any combination thereof. The load bearing substrate 702 may be coated with temporary corrosion protection layers 704 and 706 to prevent corrosion of the load bearing substrate prior to processing. Additionally, a temporary corrosion protection layer 708 can be applied over layer 704.

Each of layers 704, 706, and 708 can have a thickness of about 1 to 50 microns, such as about 7 to 15 microns. Layers 704 and 706 can include a phosphate of zinc, iron, manganese, or any combination thereof, or a nano-ceramic layer. Further, layers 704 and 706 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 708 can include functional silanes, nano-scaled silane based primers, hydrolyzed silanes, organosilane adhesion promoters, solvent/water based silane primers. Temporary corrosion protection layers 704, 706, and 708 can be removed or retained during processing.

A low friction or sliding layer 710 may be applied to the load bearing substrate 702, such as with an adhesive layer 712 or other means as described herein. The sliding layer 710 may comprise the materials described herein. Additionally, sliding layer 710 can include fillers, such as a friction reducing filler. Examples of fillers that can be used in the sliding layer 710 include glass fibers, carbon fibers, silicon, graphite, PEEK, molybdenum disulfide, aromatic polyester, carbon particles, bronze, fluoropolymer, thermoplastic fillers, silicon carbide, aluminum oxide, polyamidimide (PAI), PPS, polyphenylene sulfone (PPSO2), liquid crystal polymers (LCP), aromatic polyesters (Econol), and mineral particles such as wollastonite and barium sulfate, or any combination thereof. Fillers can be in the form of beads, fibers, powder, mesh, or any combination thereof.

In some embodiments, the sliding layer may include a woven mesh or an expanded metal grid. The woven mesh or expanded metal grid can include a metal or metal alloy such as aluminum, steel, stainless steel, bronze, or the like. Alternatively, the woven mesh can be a woven polymer mesh. In an alternate embodiment, the sliding layer may not include a mesh or grid. In another alternate embodiment, the woven mesh or expanded metal grid may be embedded between two adhesive layers.

The adhesive layer 712 may comprise a hot melt adhesive. Examples of adhesives that can be used in adhesive layer 712 include fluoropolymers, an epoxy resins, a polyimide resins, a polyether/polyamide copolymers, ethylene vinyl acetates, Ethylene tetrafluoroethylene (ETFE), ETFE copolymer, perfluoroalkoxy (PFA), or any combination thereof. Additionally, the adhesive layer 712 can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive layer 712 can include a copolymer. In an embodiment, the hot melt adhesive can have a melting temperature of not greater than about 250° C., such as not greater than about 220° C. In another embodiment, the adhesive layer 712 may break down above about 200° C., such as above about 220° C. In further embodiments, the melting temperature of the hot melt adhesive can be higher than 250° C., even higher than 300° C.

On an opposing surface of the load bearing substrate 702 from sliding layer 710, a corrosion resistant coating 714 can be applied. The corrosion resistant coating 714 can have a thickness of about 1 to 50 microns, such as about 5 to 20 microns, and such as about 7 to 15 microns. The corrosion resistant coating can include an adhesion promoter layer 716 and an epoxy layer 718. The adhesion promoter layer 716 can include a phosphate of zinc, iron, manganese, tin, or any combination thereof, or a nano-ceramic layer. The adhesion promoter layer 716 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof.

The epoxy layer 718 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin can include synthetic resin modified epoxies based on phenolic resins, urea resins, melamine resins, benzoguanamine with formaldehyde, or any combination thereof. By way of example, epoxies can include

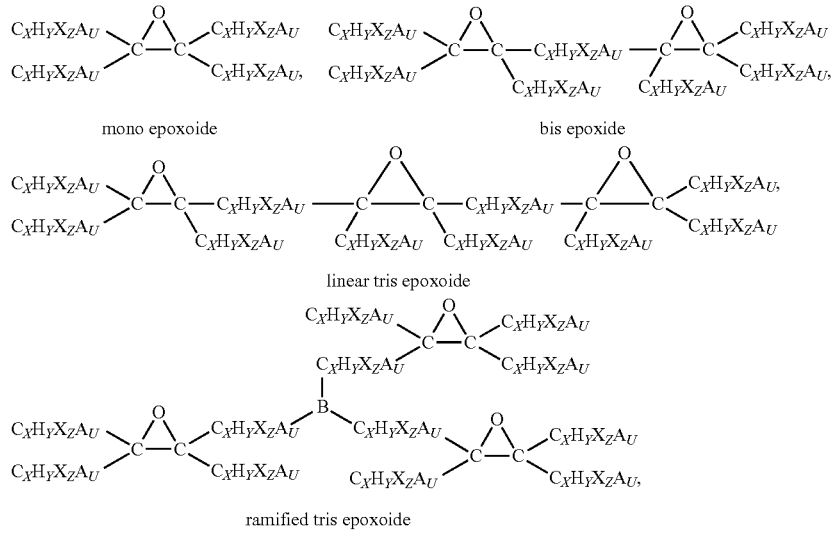

mono epoxoide bis epoxide linear tris epoxoide ramified tris epoxoide or any combination thereof, wherein $C_XH_YX_ZA_U$ is a linear or ramified saturated or unsaturated carbon chain with optionally halogen atoms $X_Z$ substituting hydrogen atoms, and optionally where atoms like nitrogen, phosphorous, boron, etc, are present and B is one of carbon, nitrogen, oxygen, phosphorous, boron, sulfur, etc.

The epoxy resin can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula $R_1R_2R_3N$ where R can be $C_XH_YX_ZA_U$ as described above.

In an embodiment, the epoxy layer 718 can include fillers to improve the conductivity, such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof. The conductive fillers can allow current to pass through the epoxy coating and can increase the conductivity of the coated bushing as compared to a coated bushing without conductive fillers.

In an embodiment, an epoxy layer can increase the corrosion resistance of the bushing. For example, epoxy layer 718 can substantially prevent corrosive elements, such as water, salts, and the like, from contacting the load bearing substrate, thereby inhibiting chemical corrosion of the load bearing substrate. Additionally, the epoxy layer can inhibit galvanic corrosion of either the housing or the load bearing substrate by preventing contact between dissimilar metals. For example, placing an aluminum bushing without the epoxy layer within a magnesium housing can cause the magnesium to oxidize. However, epoxy layer 718 can prevent the aluminum substrate from contacting the magnesium housing and inhibit corrosion due to a galvanic reaction.

This written description uses examples, including the best mode, and also to enable those of ordinary skill in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. For example, embodiments may relate to rotational devices such as an electric motor, such as a windshield wiper motor), or axial sliding applications, such as a steering column adjustment mechanism.

While embodiments have been shown or described in only some of forms, it should be apparent to those skilled in the art that they are not so limited, but are susceptible to various changes without departing from the scope of the invention.

The invention claimed is:

1. A method of forming a tolerance ring comprising:
providing a strip of resilient material comprising spring steel having a radial thickness of 0.1 to 0.7 mm;
laminating a low friction layer comprising a fluoropolymer to the strip of resilient material to form a layered structure; and
forming projections in the layered structure, wherein the projection are axially-elongated ridges with rounded peaks, wherein the tolerance ring comprises a rim disposed at an axial end, and wherein the tolerance ring is adapted to provide at least one of: a radial stiffness that is greater than 20,000 N/mm, a axial sliding force in a range of 10 to 600 N, or a slip torque in a range of 1 to 25 Nm, wherein the coefficient of friction provided by the low friction layer is in a range of about 0.04 to 0.25, wherein the projections are adapted to be compressed between inner and outer components such that the tolerance ring operates in a flattened portion of a compression/retention force characteristic whereby the projections initially exhibit elastic behavior and are plastically deformed.

2. The method of claim 1, further comprising:
bending the layered structure into a curved shape.

3. The method of claim 2, wherein bending the layered structure is performed so as to define a ring including an axial gap.

4. The method of claim 1, wherein the step of forming the projections is performed by stamping.

5. The method of claim 1, wherein the low friction layer comprises a flexible material.

6. The method of claim 1, wherein forming the projections is performed such that each projection is spaced apart from a neighboring projection by a flat section.

7. The method of claim 6, wherein the rim is contiguous with the flat sections.

8. The method of claim 1, wherein the step of laminating the low friction layer is performed with an adhesive disposed between the low friction layer and the strip of resilient material.

9. The method of claim 1, wherein corrosion resistant coating is applied to a surface of the resilient material, wherein the corrosion resistant coating comprises an epoxy layer.

10. A method of forming a tolerance ring comprising:
providing a layered structure including laminating a strip of resilient material comprising spring steel having a radial thickness of 0.1 to 0.7 mm and a low friction layer comprising a fluoropolymer;
forming projections in the layered structure; and
bending the layered structure into a curved shape, wherein the projections are axially-elongated ridges with rounded peaks, wherein the tolerance ring comprises a rim disposed at an axial end, and wherein the tolerance ring is adapted to provide at least one of: a radial stiffness that is greater than 20,000 N/mm, a axial sliding force in a range of 10 to 600 N, or a slip torque in a range of 1 to 25 Nm, wherein the coefficient of friction provided by the low friction layer is in a range of about 0.04 to 0.25, wherein the projections are adapted to be compressed between inner and outer components such that the tolerance ring operates in a flattened portion of a compression/retention force characteristic whereby the projections initially exhibit elastic behavior and are plastically deformed.

11. The method of claim 10, wherein the step of forming the projections is performed by stamping.

12. The method of claim 10, wherein bending the layered structure is performed so as to define a ring including an axial gap.

13. The method of claim 10, wherein the step of forming the projections is performed such that each projection comprises tapered shoulders.

14. The method of claim 10, wherein the step of providing a layered structure is performed by:
providing a strip of resilient material; and
laminating a low friction layer to the strip of resilient material to form a layered structure.

15. The method of claim 14, wherein the step of laminating the low friction layer is performed with an adhesive disposed between the low friction layer and the strip of resilient material.

16. A method of forming a tolerance ring comprising:
providing a strip of resilient material comprising spring steel having a radial thickness of 0.1 to 0.7 mm;
laminating a low friction layer comprising a fluoropolymer to the strip of resilient material to form a layered structure;
forming projections in the layered structure, wherein the projections are axially-elongated ridges with rounded peaks; and
bending the layered structure into a curved shape such that the low friction layer is disposed radially inside of the strip of resilient material, wherein the tolerance ring comprises a rim disposed at an axial end, and wherein the tolerance ring is adapted to provide at least one of: a radial stiffness that is greater than 20,000 N/mm, a axial sliding force in a range of 10 to 600 N, or a slip torque in a range of 1 to 25 Nm, wherein the coefficient of friction provided by the low friction layer is in a range of about 0.04 to 0.25, wherein the projections are adapted to be compressed between inner and outer components such that the tolerance ring operates in a flattened portion of a compression/retention force characteristic whereby the projections initially exhibit elastic behavior and are plastically deformed.

17. The method of claim 16, wherein the step of laminating the low friction layer is performed with an adhesive disposed between the low friction layer and the strip of resilient material.

18. The method of claim 16, wherein laminating the corrosion resistant coating is performed prior to forming the projections.

* * * * *